(12) United States Patent
Kuroda et al.

(10) Patent No.: US 7,165,251 B2
(45) Date of Patent: Jan. 16, 2007

(54) IN-CONTEXT LAUNCH MANAGEMENT METHOD, SYSTEM THEREFOR, AND COMPUTER-READABLE STORAGE MEDIUM

(75) Inventors: Takaki Kuroda, Tokyo (JP); Masanori Honda, Kanagawa (JP); Shigeru Miyake, Tokyo (JP); Shigeyuki Kobayashi, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 257 days.

(21) Appl. No.: 10/411,653

(22) Filed: Apr. 10, 2003

(65) Prior Publication Data

US 2004/0049544 A1    Mar. 11, 2004

(30) Foreign Application Priority Data

Sep. 5, 2002    (JP)    ............... 2002-260489

(51) Int. Cl.
*G06F 9/46*    (2006.01)
*G06F 15/173*    (2006.01)

(52) U.S. Cl. ............... 718/100; 718/107; 718/108
(58) Field of Classification Search ............... 718/100, 718/107, 108; 717/120; 707/102
See application file for complete search history.

(56) References Cited

U.S. PATENT DOCUMENTS

| | | | |
|---|---|---|---|
| 5,287,500 A | | 2/1994 | Stoppani |
| 5,483,654 A | * | 1/1996 | Staron et al. ............... 715/763 |
| 5,619,710 A | * | 4/1997 | Travis et al. ............... 709/203 |
| 5,819,282 A | | 10/1998 | Hooper et al. |
| 6,047,312 A | * | 4/2000 | Brooks et al. ............... 709/203 |
| 6,078,926 A | | 6/2000 | Jensen et al. |
| 6,085,198 A | | 7/2000 | Skinner et al. |
| 6,311,321 B1 | | 10/2001 | Agnihotri et al. |
| 6,499,036 B1 | | 12/2002 | Gurevich |
| 6,539,388 B1 | | 3/2003 | Hattori et al. |
| 6,651,248 B1 | * | 11/2003 | Alpern ............... 717/162 |
| 6,704,744 B1 | | 3/2004 | Williamson et al. |
| 6,826,696 B1 | * | 11/2004 | Chawla et al. ............... 726/4 |
| 2002/0046201 A1 | | 4/2002 | Hembrey |
| 2003/0055834 A1 | | 3/2003 | Hansen et al. |

(Continued)

FOREIGN PATENT DOCUMENTS

JP    06-044111 A    2/1994

(Continued)

*Primary Examiner*—William Thomson
*Assistant Examiner*—Li B. Zhen
(74) *Attorney, Agent, or Firm*—Townsend and Townsend and Crew LLP

(57) ABSTRACT

A computer has a table for managing a relationship between classes under which data to be processed unique to each of at least one first application program is classified according to a function/attribute thereof, and processes assigned to each class and each capable of being executed by a second application program. The table manages a relationship between said process and said second application program that executes said process. An in-context launching managing method comprises: when one of said data is selected, specifying the class to which said selected data belongs; extracting at least one process that is assigned to said specified class, creating a process list including the extracted process, and displaying said created process list; when one of said process is selected from said process list, accepting said selected process; and specifying the second application program related to said accepted process, and starting said specified second application program.

7 Claims, 8 Drawing Sheets

U.S. PATENT DOCUMENTS

2003/0110261 A1 6/2003 Seo et al.
2004/0034621 A1 2/2004 Tanaka et al.
2004/0139087 A1* 7/2004 Bittner et al. ............... 707/100

FOREIGN PATENT DOCUMENTS

| | | |
|---|---|---|
| JP | 07-073009 | 3/1995 |
| JP | 09-245004 A | 9/1997 |
| JP | 09-298544 A | 11/1997 |
| JP | 01-131073 A | 2/1999 |

* cited by examiner

IN-CONTEXT LAUNCH MANAGEMENT METHOD, SYSTEM THEREFOR, AND COMPUTER-READABLE STORAGE MEDIUM

CROSS-REFERENCE TO RELATED APPLICATIONS

The present application claims priority upon Japanese Patent Application No. 2002-260489 filed Sep. 5, 2002, which is herein incorporated by reference.

BACKGROUND OF THE INVENTION

1. Field of the Invention

The present invention relates to an in-context launch management method, system, and a storage medium.

2. Description of the Related Art

The amount and types of data handled by information processing systems of corporations or the like are steadily increasing. In accordance therewith, the procedures followed by system users for performing various processes on a computer tend to become complicated. Therefore, a technology for linking application programs has been demanded particularly by users who run a plurality of objects (application programs) distributed over a network to perform processes and make use of the results of the processes.

Under normal conditions, however, a plurality of application programs running on a computer system operate independently. These application programs remain indifferent to each other and seldom share property information. For example, Common Gateway Interface (CGI) programs and Java (registered trademark) applets derive environmental information from different sources. In any case, there has been no method for enabling application programs to share information and link with each other.

Under these circumstances, object-oriented programming technology, component technology, and various other technologies have been developed. Thanks to these technologies as well as the GUI technology, efforts are now increasingly made to provide linkage among application programs and reduce the operating burden on users. For example, it is now possible to open a context menu which lists "Print", "Copy", "Cut", and other available processing options when a user clicks a certain item displayed by a GUI. Through this context menu, it is possible to cause an application program (object) appropriate for the processing option selected from the context menu to run (or launch) (Japanese Patent Application Laid-open Publication No. 7-73009).

However, a technology for performing an in-context launch process to directly start (launch) another application program from a GUI window of a running application program or for repeating the above launch process have not been made available. To offer this technology, it is necessary to furnish all application programs with a launch program, which the administration manager function of each of the application programs comprises, and repository data and other data required for in-context launching.

When, for instance, an administration manager function is made to provide integrated control over storage subsystems, backup/recovery products, database products, application products, and other products, there will be an enormous number and variety of application programs targeted for in-context launching, and the application programs will be located at various locations within the system. If an attempt is made to implement the above-mentioned launch program and repository data within each application program, an excessive burden would be unavoidably imposed on application program development, maintenance, and management.

As such being the case, an in-context launch management method enabling linkage among application programs and expediting and facilitating starting (launching) of an application program matching the user's intention while minimizing the burden on application program development, maintenance, and management has been called for.

The present invention is therefore made to solve the foregoing problems and it is an object of the invention to provide an in-context launch management method, system, and storage medium.

SUMMARY OF THE INVENTION

It is therefore a primary object of the present invention to provide a method of managing in-context launching between at least two application programs using a computer, wherein the computer has a table for managing a relationship between at least one class under which data to be processed that is unique to each of at least one first application program is classified according to a function or an attribute of the data, and at least one process that is assigned to each of the class and each capable of being executed by a second application program, the table further manages a relationship between the process and the second application program that is to execute the process, and the method comprises the steps of: when one of the data of the first application program displayed on a user interface is selected by a user, specifying the class to which the selected data belongs; extracting, with reference to the table, at least one process that is assigned to the specified class, creating a process list that includes the extracted process, and displaying the created process list on the user interface; when one of the process is selected by the user from the displayed process list, accepting the selected process; and specifying, with reference to the table, the second application program that is related to the accepted process, and starting the specified second application program to execute the process.

According to the above, it becomes possible to enable linkage among application programs and expedite and facilitate starting (launching) of an application program matching the user's intention while minimizing the burden on application program development, maintenance, and management.

The above and other objects and features of the present invention will be apparent from the following detailed description of the preferred embodiments and from the accompanying drawings.

BRIEF DESCRIPTION OF THE DRAWINGS

For more complete understanding of the present invention and the advantages thereof, reference is now made to the following description taken in conjunction with the accompanying drawings wherein.

DETAILED DESCRIPTION OF THE INVENTION

Figure 1:
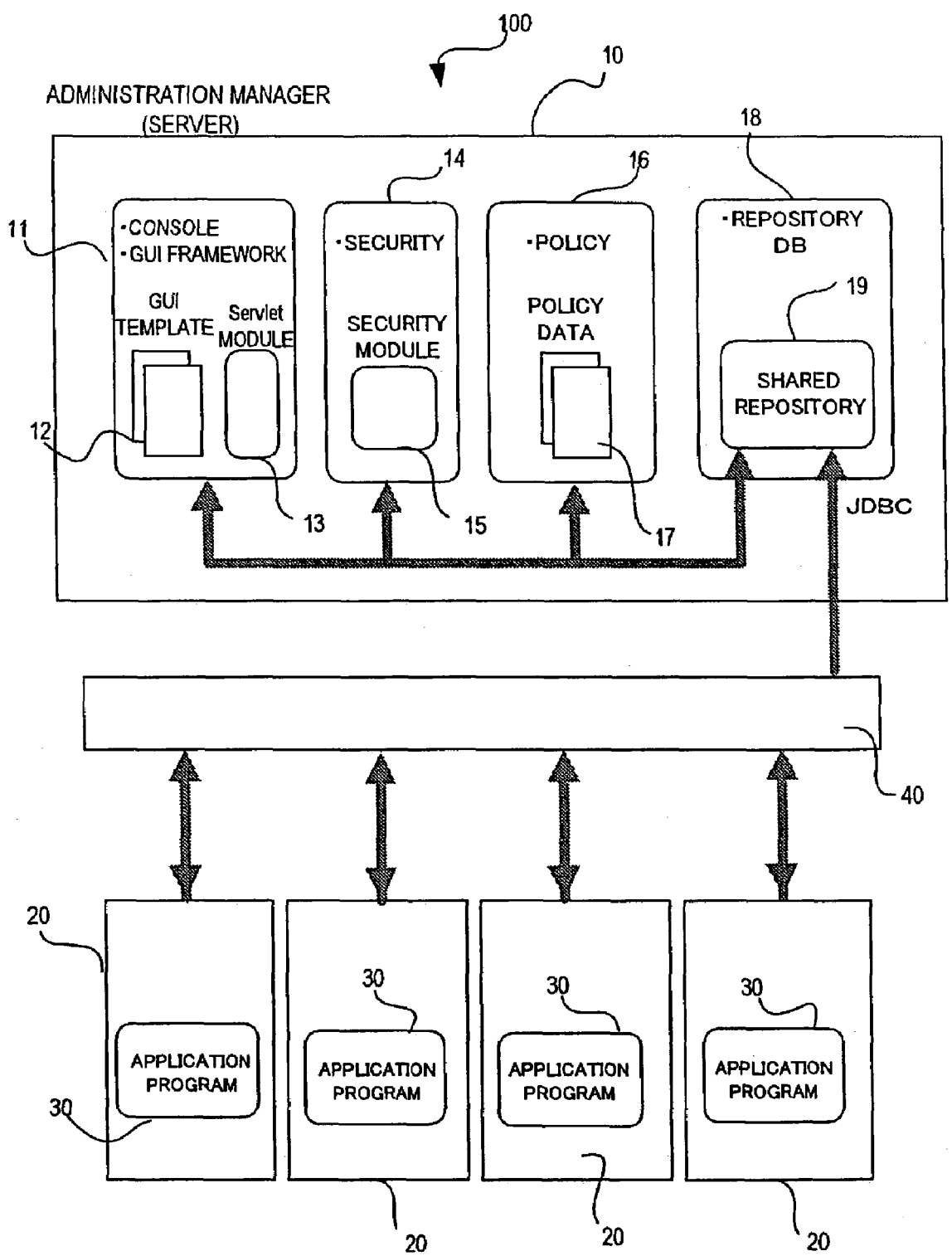
FIG. 1 is a diagram showing the configuration of a network that includes an in-context launch management system of one embodiment according to the present invention.

At least the following features and advantages of he present invention will become more fully understood from he detailed description given below.

If only one process is found when extracting, with reference to the table, the process that is assigned to the specified class, the second application program that is related to the process may be specified with reference to the table, and the specified second application program may be started to execute the process.

In this way, the system's overall processing efficiency can be enhanced without making the user perform any unnecessary selection process.

The above-mentioned steps may be repeated each time the data to be processed is selected by the user on the user interface.

In this way, situations where application programs are used at multiple levels can be flexibly and properly handled.

By transferring, to the first and second application programs, information about a session established between the user and the computer, each of the application programs may authenticate authority to use the application program, and each of the steps may be executed.

Linked application programs' authentication and permission operations are then expedited and facilitated so that unnecessary context menu display operations for standalone execution or the like can be avoided.

Another aspect of the present invention is a system for managing in-context launching between at least two application programs, comprising: a table for managing a relationship between at least one class under which data to be processed that is unique to each of at least one first application program is classified according to a function or an attribute of the data, and at least one process that is assigned to each class and each capable of being executed by a second application program, the table further managing a relationship between the process and the second application program that is to execute the process; means for specifying, when one of the data of the first application program displayed on a user interface is selected by a user, the class to which the selected data belongs; means for extracting, with reference to the table, at least one process that is assigned to the specified class, creating a process list that includes the extracted process, and displaying the created process list on the user interface; means for accepting, when one of the process is selected by the user from the displayed process list, the selected process; and means for specifying, with reference to the table, the second application program that is related to the accepted process, and starting the specified second application program to execute the process.

In this way, the in-context launch management method of the present invention can be implemented in the form of a computer system.

Another aspect of the present invention is a computer-readable storage medium having an in-context launch management program recorded thereon, wherein the program is provided for a computer having a table for managing a relationship between at least one class under which data to be processed that is unique to each of at least one first application program is classified according to a function or an attribute of the data, and at least one process that is assigned to each class and each capable of being executed by a second application program, the table further managing a relationship between the process and the second application program that is to execute the process; and the program makes the computer execute the steps of: when one of the data of the first application program displayed on a user interface is selected by a user, specifying the class to which the selected data belongs; extracting, with reference to the table, at least one process that is assigned to the specified class, creating a process list that includes the extracted process, and displaying the created process list on the user interface; when one of the process is selected by the user from the displayed process list, accepting the selected process; and specifying, with reference to the table, the second application program that is related to the accepted process, and starting the specified second application program to execute the process.

In this way, it is possible to provide a storage medium recording a program that is capable of making a computer execute the in-context launch management method of the present invention.

FIG. 1 is a diagram showing the configuration of a network that includes an in-context launch management system of one embodiment according to the present invention. The system configuration will now be described in detail with reference to the drawings.

The in-context launch management system 100 consists mainly of a server 10. The server 10 serves as an administration manager that manages and controls a plurality of application programs 30. If the application programs 30 are stored on one or more storage devices 20, such as hard disks, that are connected to the server 10 via an internal bus 40, the in-context launch management system 100 may comprise both the server 10 and the storage devices 20.

Figure 9:
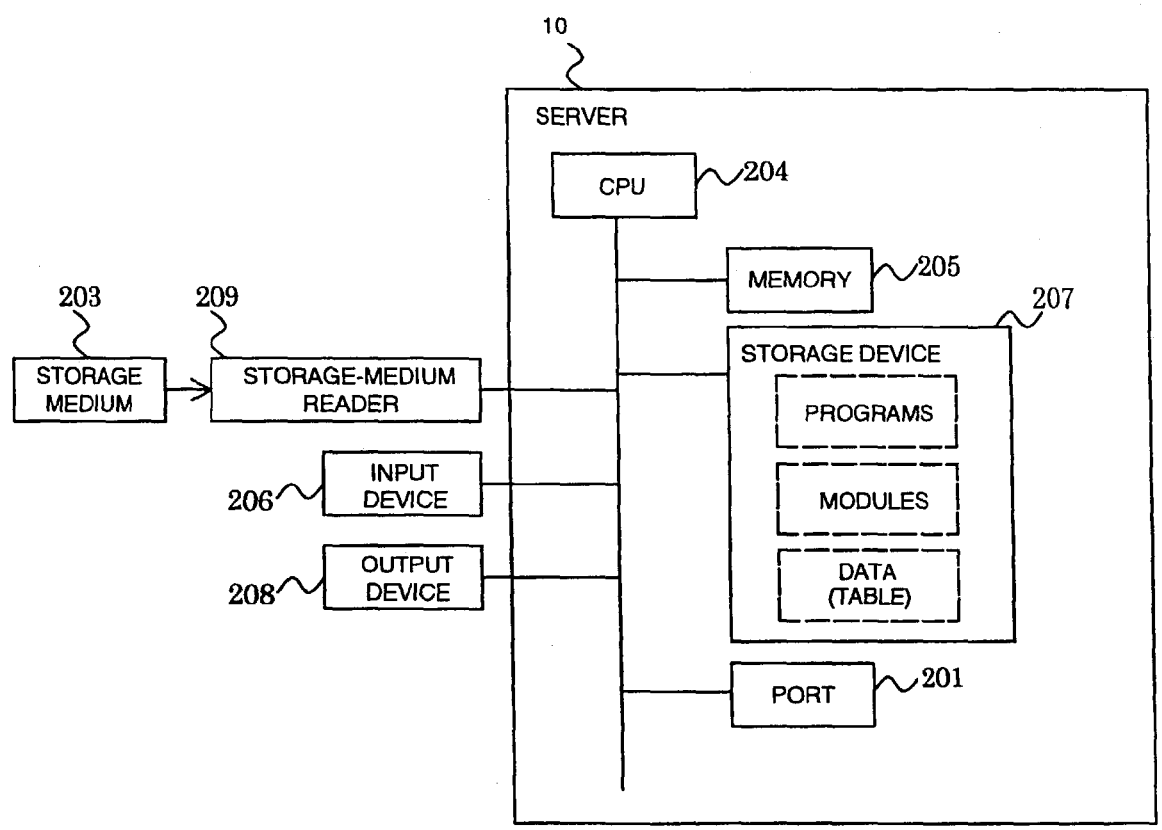
FIG. 9 is a diagram of an example of a server that forms an in-context launch management system according to an embodiment of the present invention.

FIG. 9 is a block diagram showing a configuration example of the server 10, which may serve as a system for managing in-context launching processes. In this example, the server 10 comprises a CPU (Central Processing Unit) 204, a memory 205, a storage device 207, a storage-medium reader 209, an input device 206, an output device 208, and a port 201.

The CPU 204 takes charge of the overall control of the server 10 and realizes various functions according to the present embodiment by executing various programs stored in the memory 205. The storage device 207 can store various programs and data. For example, hard disk devices and the like may be used as the storage device 207. In the present example, the storage device 207 stores, e.g., the later-described modules and the later described repository data 19 (or, the process definition table 300). Note that the storage device 207 may be build into the server 10, or it may be mounted externally. The storage-medium reader 209 is a device for reading various programs (such as the program for managing the in-text launching) and/or data (such as the necessary tables) recorded on a storage medium 203. The various programs and/or data that have been read are stored in the storage device 207. Flexible disks, CD-ROMs, semiconductor memories and the like can be used as the storage medium 203. The storage-medium reader 209 may be build into the server 10, or it may be mounted externally. The input device 206 is used for an operator (or user) to input data to the server 10. For example, a keyboard, a mouse, a DCE (data communication equipment) such as a modem for receiving data, or any other appropriate equipment may be used as the input device 206. The output device 208 is used as a device for outputting (expressing) various information. For example, a display, a printer, a DCE such as a modem for sending data, or any other appropriate equipment may be used as the output device 208. The port 201 is used for communication with, for example, the internal bus 40 and/or other networks to connect with, for example, the storage device 20 and/or other computers that access the server 10.

Provided with an appropriate file system, the server 10 manages and executes the application programs 30. If the storage devices 20 are connected to the server 10 via some kind of network, I/O requests and various other data may be transmitted to the network via drivers, such as a SCSI driver, and a NIC (Network Interface Card), to thereby communicate data. The network connecting the server 10 to the storage devices 20 may be the Internet, a LAN, or any other network based on any protocol as far as it can implement the present invention.

Further, the storage devices 20, in which the application programs 30 are stored, may be physical units or logical units that compose a storage subsystem or may be a disk array device. In this configuration, the above-mentioned administration manager comprises an additional function for managing the configuration, capacities, addresses, and data processing status of each of the drives and hardware devices within the storage subsystem, the installation option information about the application programs 30, and the management information retained by the application programs 30. Furthermore, a switching device can be used instead of the bus 40 for the storage subsystem. A disk array device can be used instead of the storage devices 20.

When the server 10 manages the storage subsystem as well, the server 10 is connected to a storage controller (not shown) of each of the storage subsystems via SCSI, Fibre Channel, or like interfaces (not shown). Not to mention, the storage controller comprises, for example: a CPU; an input/output interface with the server 10; a cache memory; a shared memory; a channel adapter; and a disk adapter.

The storage controller manages the storage areas offered by the storage devices through the use of logical units organized using logical storage areas of a plurality of storage devices 20, and data blocks partitioned in the logical units. The logical units are to be identified by LUNs (Logical Unit Numbers). The data blocks are to be specified by block addresses. In the above situation, SCSI, Fibre Channel, and iSCSI can be used as the protocol for defining and controlling the data communication between the storage devices 20 and the server 10. It is needless to say that any network and/or protocol may be used as far as they can implement the present invention.

In any case, the server 10, which manages the plurality of application programs 30, includes some modules for realizing the in-context launch management method of the present invention. One type of module 11 provides a console that functions as an interface for mainly performing computer control and job management, and also provides a GUI framework which serves as an architecture for GUIs composing the interface. This module 11 includes a plurality of GUI templates 12, which provide console interface templates, and a Servlet (registered trademark) module 13.

The Servlet module 13 comprises software for controlling the execution of application programs 30 on the server 10, and operates by adding-on to the server 10. For example, the Servlet module 13 functions as a gateway between the server 10 and CORBA (registered trademark) and other services. More specifically, the Servlet module 13 can support an inter-object message exchange function in a distributed system environment. Therefore, this module serves as a part of an in-context launch tool for allowing one application program to call and execute another application program.

A policy security module 14 is also provided. This module 14 serves to provide functions for login processing and access management in relation to the server 10. A module 15 for such a function is provided as well.

In addition, a policy module 16 is provided. This module 16 can limit available functions, such as resources and programs, depending on the situation. For example, the module 16 can limit the usable objects in accordance with the session information about a user who has logged into the server 10.

The server 10 also comprises a repository database 18 in addition to the above modules 11, 14, 16. The repository database 18 manages shared repository data (table or process definition table). The shared repository data 19 consists of configuration information about the application programs 30, information about hardware configuration and setup, and management information retained by the application programs 30 and necessary for linking the application programs 30 and performing in-context launching. When a "callback" process is performed for in-context launching of the application programs 30, the server 10 refers to the shared repository data 19 in the repository database 18. The data structure of the shared repository data 19 and the "callback" process will be described later.

JDBC (registered trademark) (Java Database connectivity) is used for storing and referencing various data including those on accesses between the application programs 30 and the repository database 18. JDBC is a standard interface devised for enabling a Java (registered trademark) program to access a database. Thanks to JDBC, networked servers and databases can be connected with various drivers.

Figures 2, 3:
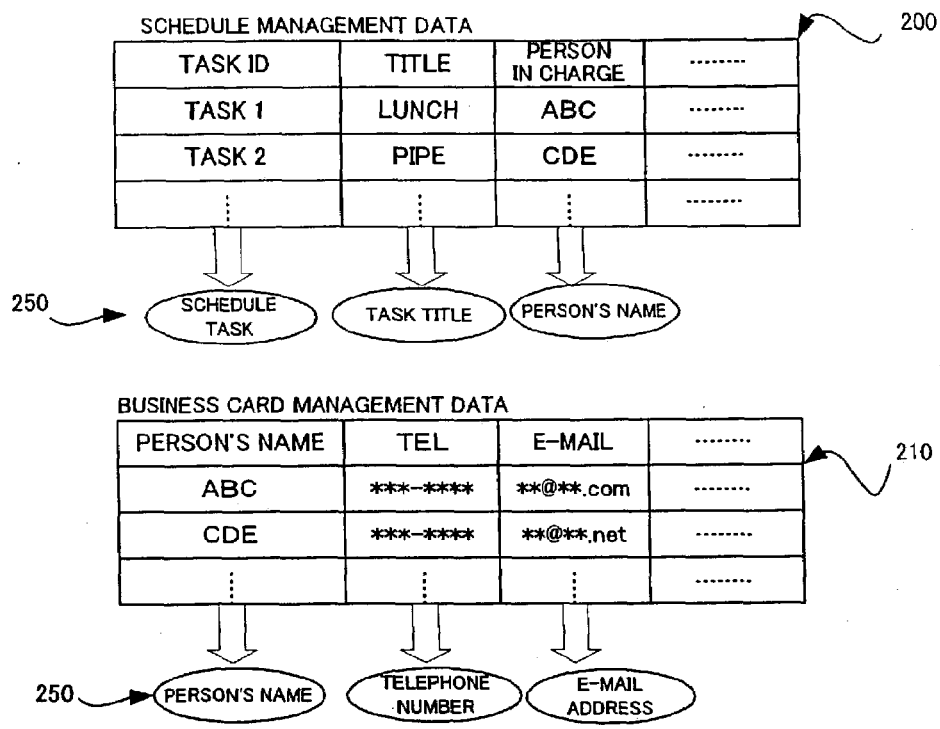
FIG. 2 is a schematic diagram of schedule management data and business card management data according to the present embodiment.
FIG. 3 shows the data structure of a process definition table according to the present embodiment.

FIG. 2 presents schematic diagrams of schedule management data and business card management data according to the present embodiment of the present invention. FIG. 3 shows the data structure of a process definition table according to the present embodiment. If, for instance, the application programs 30 to be managed by the server 10 comprise a schedule management program and a business card management program, both of these programs contain specific process data to be processed and perform a process necessary for schedule management or business card management.

The process data for the schedule management program is schedule management data 200, which is shown in FIG. 2. The schedule management data 200 is structured so as to contain data about scheduled tasks, their titles, and the names of the persons in charge. On the other hand, the process data for the business card management program is business card management data 210, which is shown in FIG. 2. The business card management data 210 is structured so as to contain various data about the persons described in the business cards, including their names, telephone numbers, and e-mail addresses for contacting them.

The process data that structures the data structure described above are classified according to their attributes and other elements, and they are defined by classes 250. In object-oriented programming, the term "class" indicates a definition of functions and/or properties (attributes) that are common to some objects. The use of class definitions makes it easy to handle a group of objects that are similar in functions and/or properties. In the present embodiment, the process data are defined by classes. For example, to the above schedule management data 200, the following classes 250 are assigned: a "schedule task" class for managing all task IDS; a "task title" class for managing all task titles; and a "person's name" class for managing the persons in charge of a certain task. In like manner, classes 250 such as a "person's name" class, a "telephone number" class, and an "E-MAIL address" class can be assigned to the business card management data 210. The actual process data for the individual classes 250 can be regarded as instances that belong to the respective classes.

In the present embodiment, each process data is appropriately output to a user interface upon, for example, execution of an application program. The process data having been output is to be selected by a user in an in-context launch process. In object-oriented programming, the term "context" generally refers to the status or environment of a process that is being performed. In the present embodiment, the term "context" indicates, for instance, a situation where a user manipulates the mouse cursor on a console GUI and clicks on any of the above-mentioned output process data to select it. In accordance with such a process data selection, a context menu, for example, pops up, allowing the user to select a further process (another application program) that is to be launched.

When the process data is selected and the linked application program is to be launched as explained above, the above-mentioned shared repository data 19 is referred to. FIG. 3 shows an actual example of the repository data 19: a process definition table 300. In the process definition table 300, the following data are associated with each other: the classes, which are defined according to the above process data, as a key; names of processes applicable to the indicated class; processing operation data specifying the application program that performs the process; and command data (or link description) to be executed by the application program. Based on the class of the process data, the server 10 creates a process list that corresponds to the process data class from the process definition table 300 and displays the list on a user interface.

Figure 4:
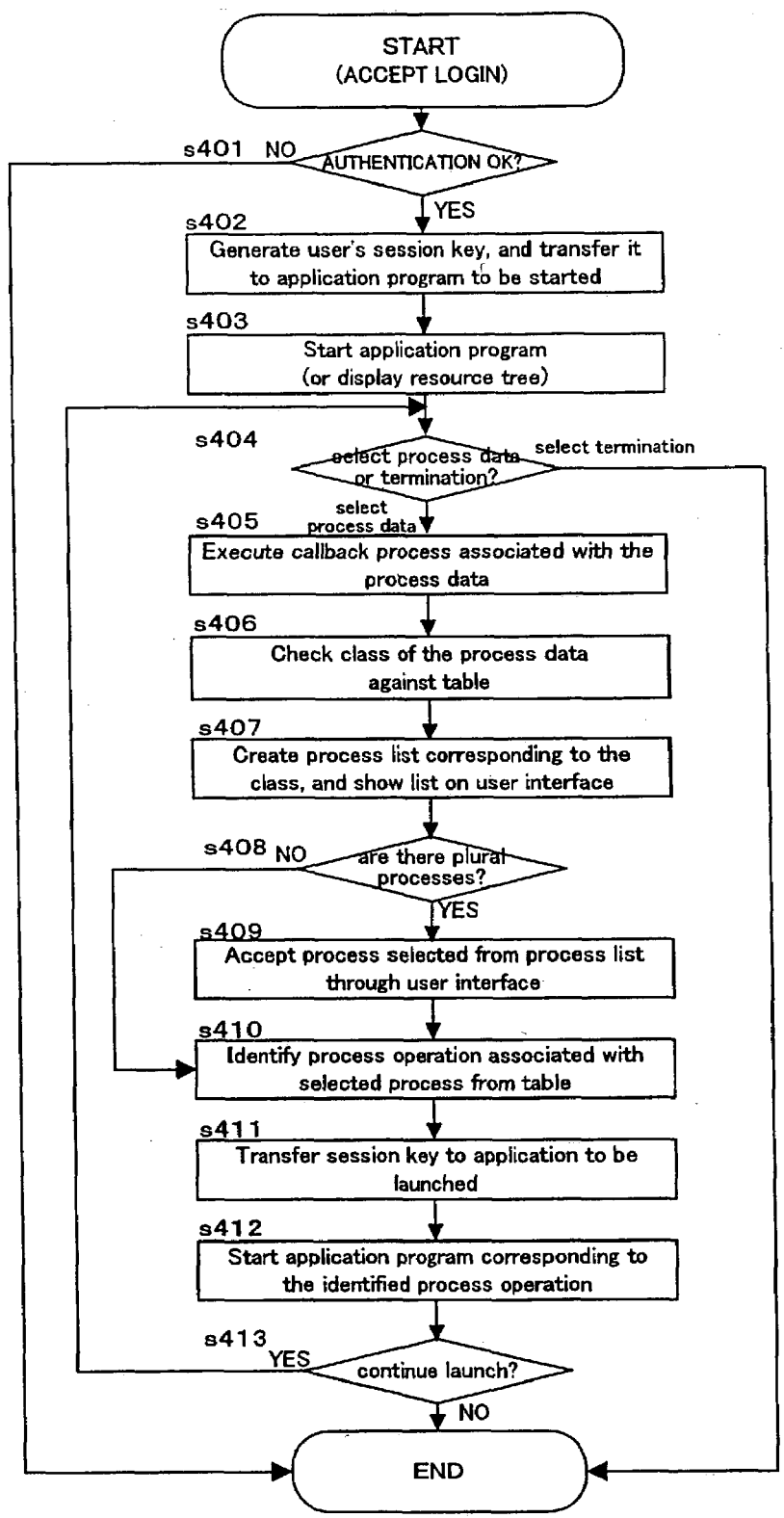
FIG. 4 is a flowchart that illustrates the steps for executing an in-context launch management method of the present embodiment.

FIG. 4 is a flowchart that illustrates the steps for executing the in-context launch management method of the present embodiment. The processing steps will be described in detail with reference to FIGS. 5 to 8 which show examples (examples 1 through 4) of how the display on the screen changes. It will be assumed that the server 10 applies the GUI templates of module 11 to the console screen in accordance with the GUI framework and outputs them to a user interface.

Figure 5:
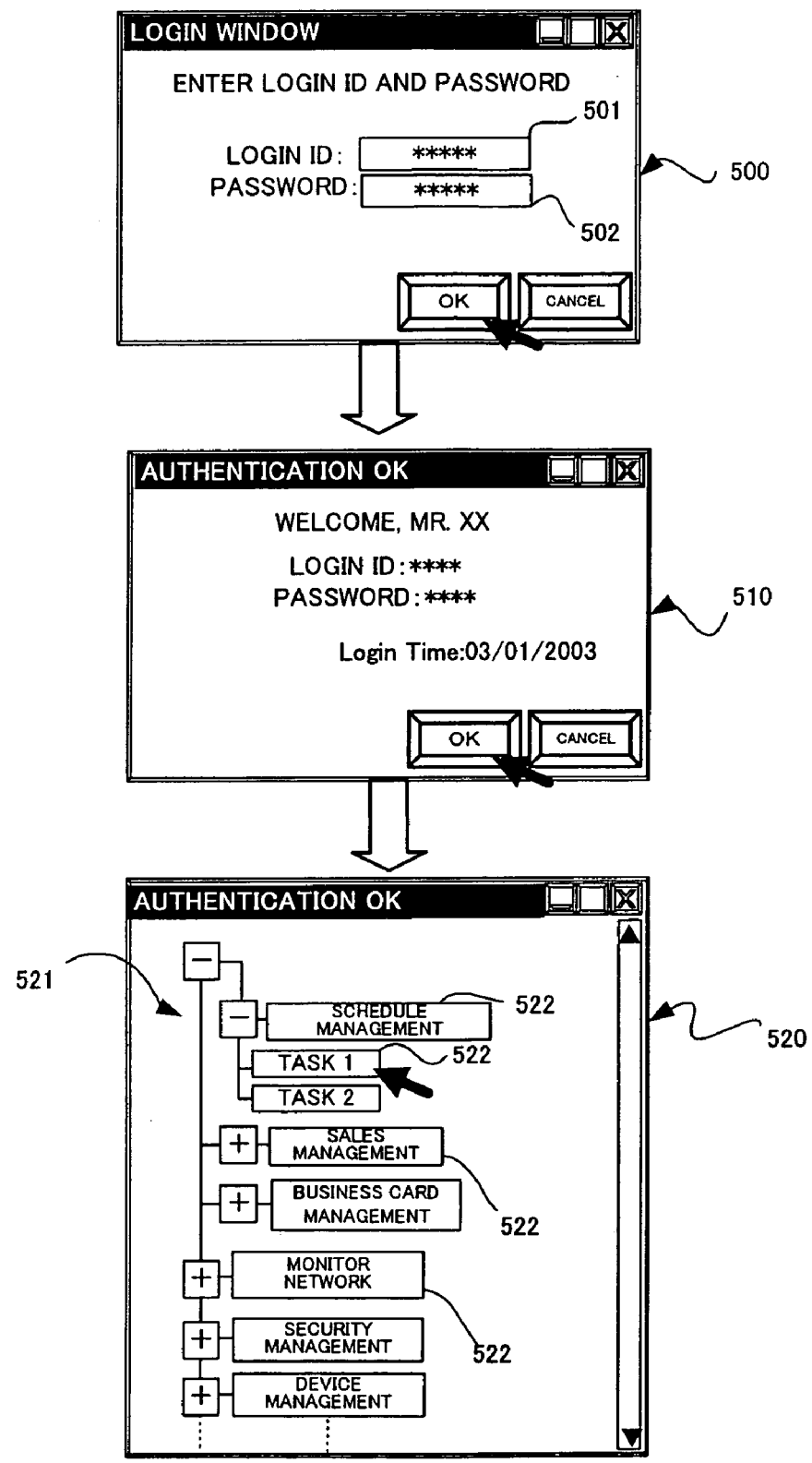
FIG. 5 is a diagram of an example (example 1) showing how a screen changes in the in-context launch management method according to the present embodiment.
Figure 6:
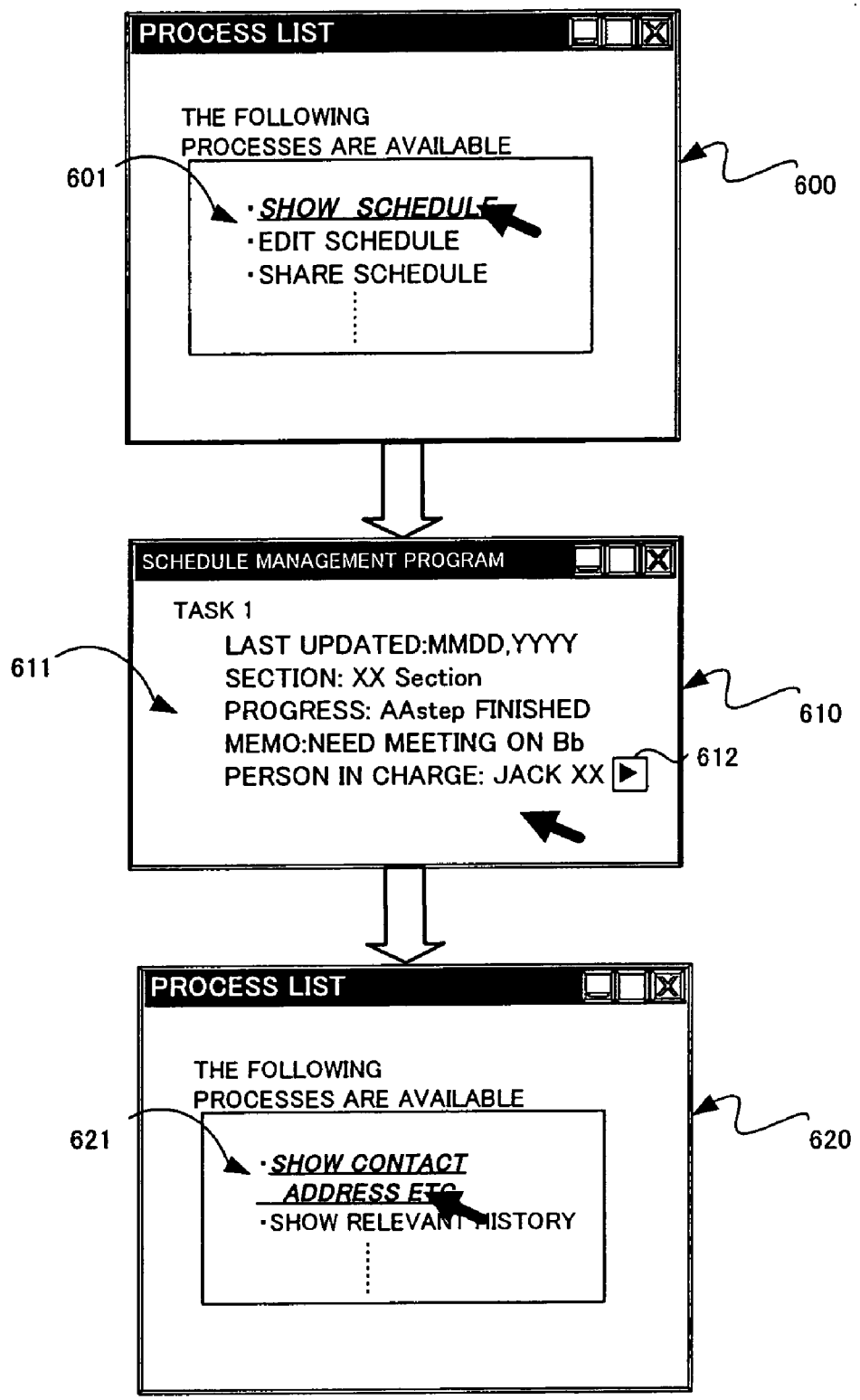
FIG. 6 is a diagram of an example (example 2) showing how a screen changes in the in-context launch management method according to the present embodiment.
Figure 7:
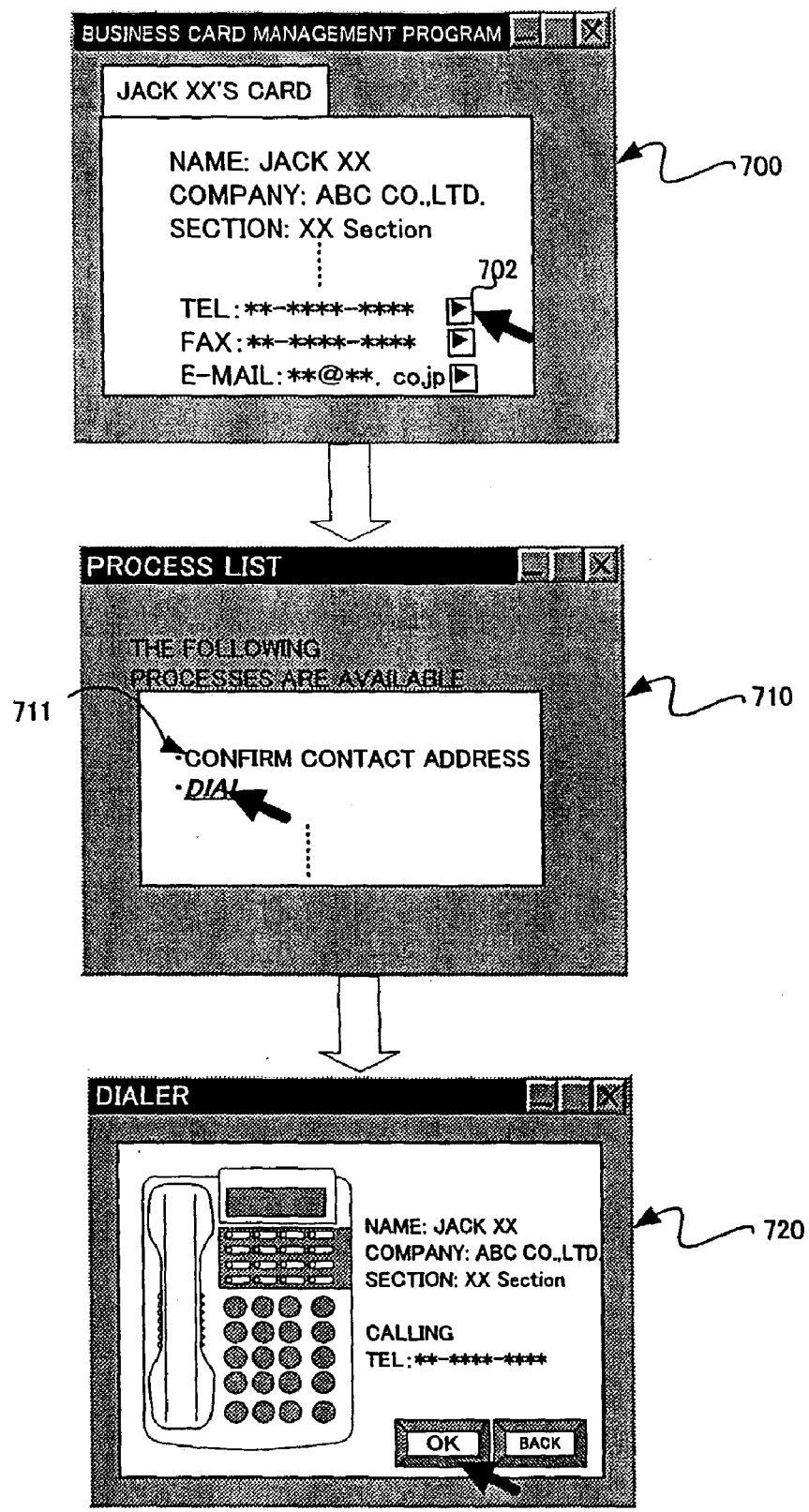
FIG. 7 is a diagram of an example (example 3) showing how a screen changes in the in-context launch management method according to the present embodiment.

The first console screen is a login window 500, which is shown in FIG. 5. The user enters a login ID and password in the respective input fields 501, 502 of the login window to prompt execution of a login process. The server 10 performs an authentication process in the security module 15. When the user is recognized as having the authority to log in (s401: YES), the server 10 generates a session key and displays it on the window 510. If the user cannot be authenticated (s401: NO), the server 10 terminates the process.

The session key generated during the login process is, for example, stored in an appropriate storage means such as the repository database 18 with its validity period defined. The session key becomes invalid when its validity period expires. If the user's operation at the console is accepted after expiry of the validity period, the user is requested to go through an authentication process again. When an appropriate application program is started after user login, the session key is transferred to the application program (s402).

The session key allows the authority of a user, who has first logged into the server 10, to be valid in all linked application programs and serves to authenticate the authority to use the application programs.

In the example shown in FIG. 5, a resource tree 521 is first output on the console window 520 instead of starting an application program (s403). The resource tree 521 is hierarchically structured to show each process data, such as the above-mentioned schedule management data 200 and business card management data 210. The names of the process data are output in respective display fields 522.

When a display field (process data) displayed on the GUI of the window 520 is clicked or otherwise selected by a user, the server 10 performs a "callback" process that is associated with the selected process data (s404: process data selection; s405). This "callback" process is a process in which when, for example, one of the data of an application program (a "first application program") displayed on the user interface is selected by the user, the class to which the selected data belongs is specified in order to create a process list (which is explained below). In this embodiment, for example, the program that is in charge of displaying the resource tree would perform the callback process. If, on the other hand, the user does not select any of the display fields and instead selects the "End Process" or like option or issues an instruction for process termination, the process is terminated.

The example shown in FIG. 5 indicates that "Task 1" under "Schedule Management" has been clicked. If the server 10 manages a Web application program, a link description such as "http:// . . . callback? class=scheduletask# value=task1" is embedded in the display field 522 for "Task 1". It can be assumed that the Servlet module 13 performs a callback process based on this link description.

As regards "Task 1" (which is the process data selected by the user), its class, "Schedule Task", is searched for in the above-mentioned process definition table 300 to create a process list (s406). The process definition table 300 indicates that the three processes, "Show Schedule", "Edit Schedule", and "Share Schedule", belong to the "Schedule Task" class. Therefore, a process list including these three processes is displayed on the user interface (s407).

If there is only one matching process when creating the process list from the process definition table 300 (s408: NO), the "processing operation" (in other words, the "second application program") associated with this process is specified from the process definition table 300. Then, a process for starting an application program ("second application program") associated with the specified processing operation is performed.

If, on the other hand, there are two or more matching processes in the process list (s408: YES), the created process list 601 is output to console window 600 (see FIG. 6). When a certain process in the process list 601 is selected by a user, such a process selection is accepted (s409). If, for instance, the "Show Schedule" process is selected from window 600 and the link description "http:// . . . /scheduler?task=task1#callback="http:// . . . /callback" is embedded in it, it can be recognized that the application program ("second application program") related to the process name "Show Schedule" in the process definition table 300 is "Scheduler" (s410).

Then, the session key is transferred in the same manner as above (s411), and the relevant application program is started (s412). The program "Scheduler" is the aforementioned schedule management program. The schedule management program acquires process data from the schedule management data 200 and displays schedule contents 611 in window 610.

In window 610, a tag 612 is attached to "Jack XX" (the name of the person in charge) in the "Person in charge" field to indicate that an additional launch is possible (that is, to indicate that another application program can be launched through this screen 611). If there is no further launchable application program for the displayed process data, this tag 612 will not appear, indicating that no more linked launch is available. In any case, the launch destinations available for each class are specified in the process definition table 300. It is preferred that the process definition table 300 be automatically updated whenever the number of application programs 30 increase or decrease or the class definitions change.

Since "Jack XX" belongs to the "Person's Name" class, when the above tag 612 is clicked (s413: YES), a callback process is performed in the same manner as above to create a process list for the "Person's Name" class from the process definition table 300. The following two process names are related to the "Person's Name" class: "Show Contact Address Etc." and "Show Relevant History". If a user selects the "Show Contact Address Etc." process, the "Business Card Management Program", which is associated to the "Show Contact Address Etc." process, is launched upon session key transfer. The business card management program selects the process data about "Jack XX" from the business card management data 210 and displays it on screen as shown in window 700 in FIG. 7.

In window 700, "Telephone Number", "FAX", and "E-MAIL address" are each provided with a tag 702, which indicates that an additional launch is possible. If the tag 702 is clicked, a callback process is performed in the same manner as above to create a process list 711 for the "Telephone Number" class from the process definition table 300. Two process names are related to the "Telephone Number" class: "Confirm Contact Address" and "Dial". If the user selects the "Dial" process, the "Dialer Program", which is related to this "Dial" process, is launched upon session key transfer. The dialer program displays a GUI as shown in window 720 and actually makes a telephone call to "Jack XX". When the successive launch sequence is completed in the process carried out in window 720, the processing sequence for the present embodiment is terminated.

Figure 8:
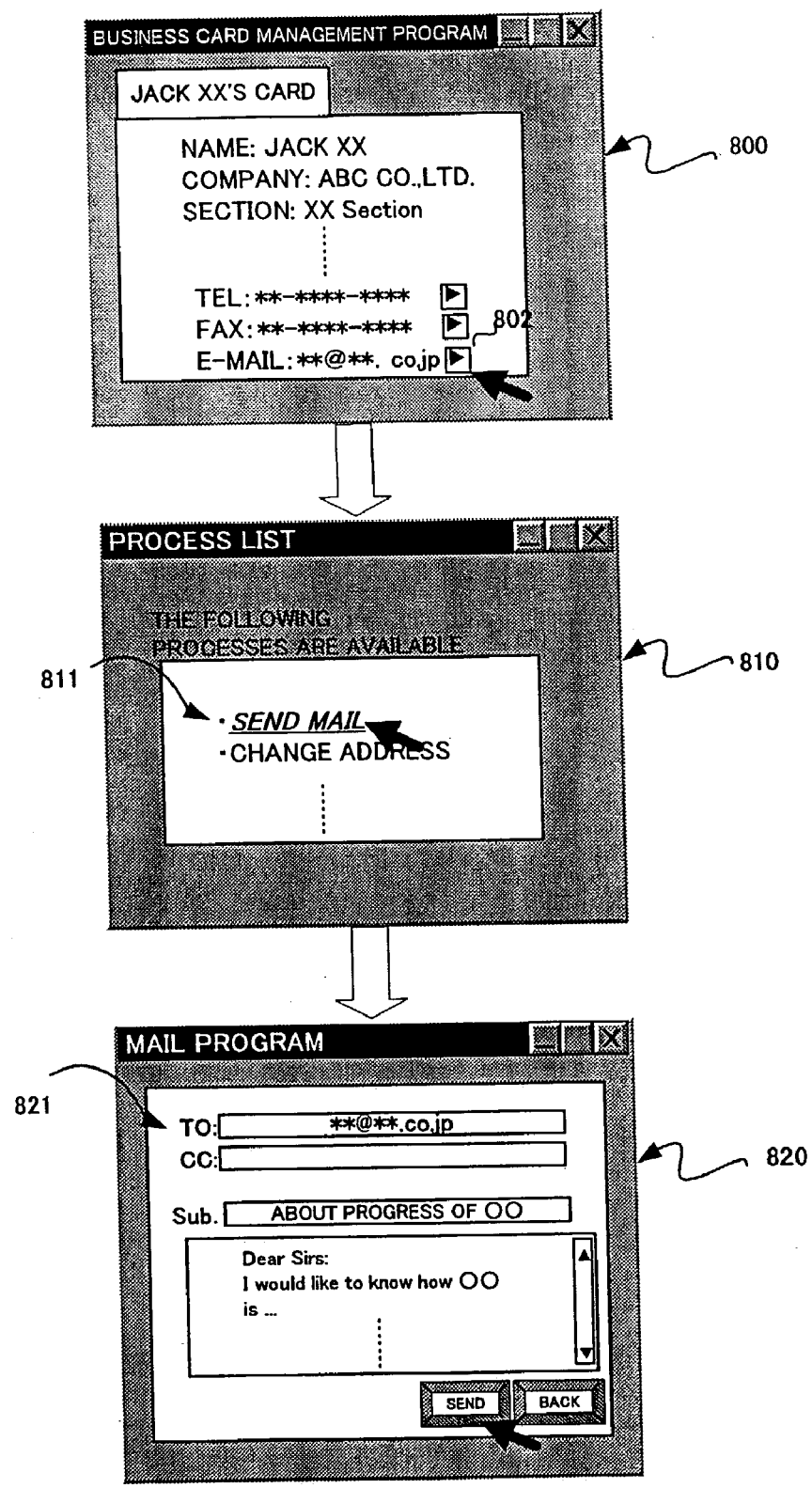
FIG. 8 is a diagram of an example (example 4) showing how a screen changes in the in-context launch management method according to the present embodiment.

Further, as shown in FIG. 8, if a tag 802, which indicates that an additional launch is possible for the "E-MAIL address", is clicked in the business card management program's window 800, a callback process is performed in the same manner as above to create a process list 811 related to the "E-MAIL Address" class from the process definition table 300. Two process names are related to the "E-Mail Address" class: "Send Mail" and "Change Address". If the user selects the "Send Mail" process, the "Mail Program", which is related to the "Send Mail" process, is launched upon session key transfer. The mail program displays a GUI as shown in window 820 and furnishes a mail transmission form 821 for sending an e-mail to "@.co.jp", which is the e-mail address of "Jack XX". When the successive launch sequence is completed in the process carried out in window 820, the processing sequence for the present embodiment is terminated. As described above, in-context launch processes can be repeated in accordance with the process data selection from a GUI in the console screen.

In the present embodiment, Web applications are used as examples of the application programs 30. However, the in-context launch management method of the present invention is not limited to the use of Web applications. As described earlier, the present invention is also applicable to situations where the application programs 30 are distributed among various locations in a storage subsystem. The present invention can be rendered applicable to these situations by modifying the manner of data exchange between the above application programs 30 and the server 10 according to the storage subsystem's hardware configuration, network protocol, and other elements, and replacing the above-mentioned link descriptions etc. with appropriate commands.

The advantages provided by the embodiment of the present invention will now be described.

The in-context launch management method of the present invention makes it possible to start one application program and perform an in-context launch process from a GUI screen of the started application program to directly start (launch) another application program. The use of this method also eliminates the necessity for incorporating a launch program or repository data required for the in-context launch process into each application program, thereby reducing an excessive burden on application program development, maintenance, and management. More specifically, the in-context launch management method of the present invention makes it possible to provide linkage among application programs and expedite and facilitate launching application programs matching the user's needs while minimizing the burden on application program development, maintenance, and management.

Although the preferred embodiment of the present invention has been described in detail, it should be understood that various changes, substitutions and alterations can be made therein without departing from spirit and scope of the inventions as defined by the appended claims.

What is claimed is:

1. A computer implemented method of managing in-context launching between at least two application programs using a computer, wherein
    said computer has a table for managing a relationship between
        a plurality of classes under which data to be processed by a plurality of first application programs are classified according to a function or an attribute of said data, and
        a plurality of processes that are applicable to each of said classes and are provided by a plurality of second application programs which include said first application programs, and
    said table further manages relationships between said processes and said second application programs that provide said processes,
    said method comprising:
    accepting a log-in request by a user;
    listing data to be processed by said first application programs on a user interface, said listed data relating to data included in said classes;

when one of said data processed by one of said first application programs and displayed on said user interface is selected by said user, specifying one of the classes to which said selected data belongs;

extracting at least one of said processes that corresponds to said specified one of said classes from said table, creating a process list that includes the extracted process, and displaying said created process list on said user interface;

when one of said processes is selected by the user from said displayed process list, accepting said selected process;

specifying, based on said table, one of the second application programs that provides said accepted process, and launching said specified second application program to execute said accepted process, wherein said accepted process is one of multiple processes that are executable by said specified second application program;

displaying data acquired by launching said specified second application program;

when one of said data inquired by launching said specified second application program and including the classes of said table is further selected by said user, further specifying the classes to which said further selected data belongs;

further extracting at least one of said processes that correspond to said further specified one of the classes from said table, further creating another process list that includes the further extracted process, and further displaying said further created process list on said user interface;

when one of said processes is further selected by said user from said further displayed process list, further accepting said further selected process; and further specifying, based on said table, another one of the second application programs that provides said further accepted process, and launching said specified another second application program to execute said further accepted process, wherein said further accepted process is one of multiple processes that are executable by said specified another second application program.

2. A computer implemented method of managing in-context launching according to claim 1, wherein, if only one process is found when extracting the process that corresponds to said specified class from said table, the second application program that provides the process is specified with reference to said table, and said specified second application program is started to execute said process.

3. A computer implemented method of managing in-context launching according to claim 1, wherein said steps are repeated each time said data to be processed is selected by the user on said user interface.

4. A computer implemented method of managing in-context launching according to claim 1, wherein by transferring, to said first and second application programs, information about a session established between the user and said computer, each of said application programs authenticates authority to use the application program, and each of said steps is executed.

5. A system for managing in-context launching between at least two application programs, comprising:

a table for managing a relationship between a plurality of classes under which data to be processed by a plurality of first application programs are classified according to a function or an attribute of said data, and a plurality of processes that are applicable to each of said classes and are provided by a plurality of second application programs which include said first application programs, said table further managing relationships between said processes and said second application programs that provide said processes, means for accepting a log-in request by a user;

means for listing data to be processed by said first application programs on a user interface, said listed data relating to data included in said classes;

means for specifying, when one of said data processed by said first application program and displayed on said user interface is selected by a user, the class to which said selected data belongs;

means for specifying, when one of said data processed by one of said first application programs and displayed on said user interface is selected by said user, one of the classes to which said selected data belongs;

means for extracting at least one of said processes that corresponds to said specified one of said classes from said table, creating a process list that includes the extracted process, and displaying said created process list on said user interface;

means for accepting, when one of said processes is selected by the user from said displayed process list, said selected process;

means for specifying, based on said table, one of the second application programs that provides said accepted process, and launching said specified second application program to execute said accepted process, wherein said accepted process is one of multiple processes that are executable by said specified second application program;

means for displaying data acquired by launching said specified second application program;

means for further specifying, when one of said data inquired by launching said specified second application program and including the classes of said table is further selected by said user, the classes to which said further selected data belongs;

means for further extracting at least one of said processes that correspond to said further specified one of the classes from said table, further creating another process list that includes the further extracted process, and further displaying said further created process list on said user interface;

means for further accepting, when one of said processes is further selected by said user from said further displayed process list, said further selected process; and means for further specifying, based on said table, another one of the second application programs that provides said further accepted process, and launching said specified another second application program to execute said further accepted process, wherein said further accepted process is one of multiple processes that are executable by said specified another second application program.

6. A computer-readable storage medium having an in-context launch management program recorded thereon, wherein said program is provided for a computer having a table for managing a relationship between a plurality of classes under which data to be processed by a plurality of first application programs are classified according to a function or an attribute of said data, and a plurality of processes that are applicable to each of said classes and are provided by a plurality of second application programs which include said first application programs, and said table further managing relationships between said processes and said second application programs that provide said processes, said program comprising:

code for accepting a log-in request by a user;

code for listing data to be processed by said first application programs on a user interface, said listed data relating to data included in said classes;

code for specifying, when one of said data processed by said first application program and displayed on said user interface is selected by a user, the class to which said selected data belongs;

code for specifying, when one of said data processed by one of said first application programs and displayed on said user interface is selected by said user, one of the classes to which said selected data belongs;

code for extracting at least one of said processes that corresponds to said specified one of said classes from said table, creating a process list that includes the extracted process, and displaying said created process list on said user interface;

code for accepting, when one of said processes is selected by the user from said displayed process list, said selected process;

code for specifying, based on said table, one of the second application programs that provides said accepted process, and launching said specified second application program to execute said accepted process, wherein said accepted process is one of multiple processes that are executable by said specified second application program;

code for displaying data acquired by launching said specified second application program;

code for further specifying, when one of said data inquired by launching said specified second application program and including the classes of said table is further selected by said user, the classes to which said further selected data belongs;

code for further extracting at least one of said processes that correspond to said further specified one of the classes from said table, further creating another process list that includes the further extracted process, and further displaying said further created process list on said user interface;

code for further accepting, when one of said processes is further selected by said user from said further displayed process list, said further selected process; and code for further specifying, based on said table, another one of the second application programs that provides said further accepted process, and launching said specified another second application program to execute said further accepted process, wherein said further accepted process is one of multiple processes that are executable by said specified another second application program.

7. A computer implemented method of managing in-context launching between at least two application programs using a computer, wherein said computer has a process definition table for managing a relationship between a plurality of classes under which data to be processed by a plurality of first application programs are classified according to a function or an attribute of said data, and a plurality of processes that are applicable to each of said classes and are provided by a plurality of second application programs which include said first application programs, and wherein said process definition table further manages relationships between said processes and said second application programs that provide said processes, the method comprising:

accepting a login request by a user;

if the user has no authority to log in, terminating launching process;

if the user has authority to log in, generating a session key for the user, displaying the session key, and transferring the session key to an application program to be started;

outputting a resource tree on a GUI (graphical user interface), the resource tree being hierarchically structured to show each process data;

if the user selects termination, terminating launching process;

if the user selects process data, performing a callback process associated with the selected process data, in which when one of the data of one of the first application programs displayed on the GUI is selected by the user, a class to which the selected process data belongs is specified in order to create a process list using a process definition table;

displaying the created process list on the GUI;

if the process list contains one process, starting one of the second application programs associated with processing operation specified in the process definition table for the one process, wherein said one process is one of multiple processes that are executable by said second application program;

if the process list contains a plurality of processes, accepting a selection of one of the processes by the user and starting one of the second application programs associated with processing operation specified in the process definition table for the selected process; transferring the session key for the user to the second application program which is to be started; starting the second application program corresponding to the associated processing operation specified in the process definition table; and displaying content associated with the second application program, wherein said accepted process is one of multiple processes that are executable by said second application program; and if the process list contains one or more remaining processes that has not be launched, accepting a selection of one of the one or more remaining processes by the user and starting another second application program associated with processing operation specified in the process definition for the selected process; transferring the session key for the user to the another second application program which is to be started; starting the another second application program corresponding to the associated processing operation specified in the process definition table; and displaying content associated with the another second application program, wherein said accepted one remaining process is one of multiple processes that are executable by said another second application program.

* * * * *